No. 735,308. PATENTED AUG. 4, 1903.
H. F. SNYDER.
CORN SHREDDER AND HUSKER.
APPLICATION FILED APR. 7, 1902.
NO MODEL. 6 SHEETS—SHEET 5.
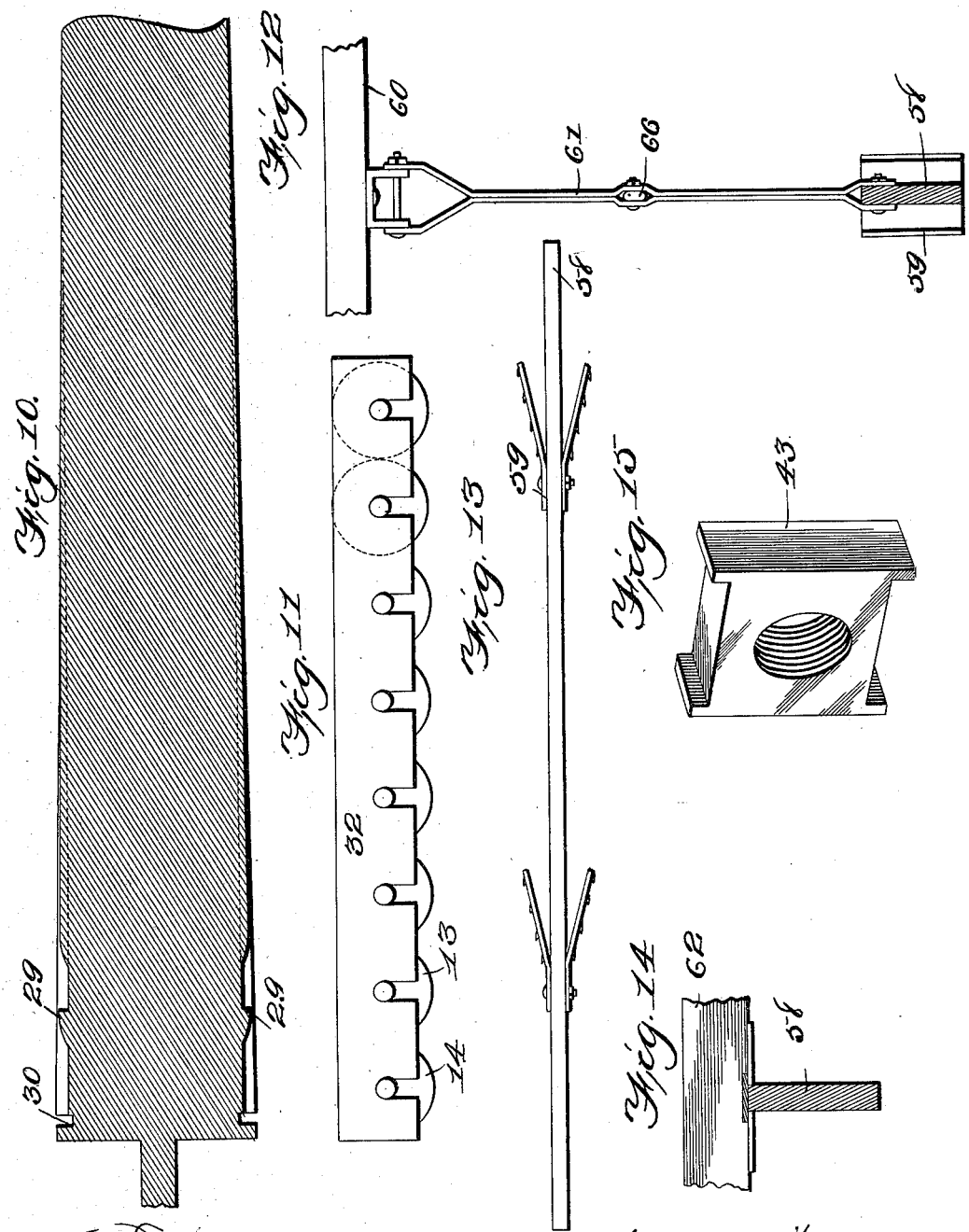

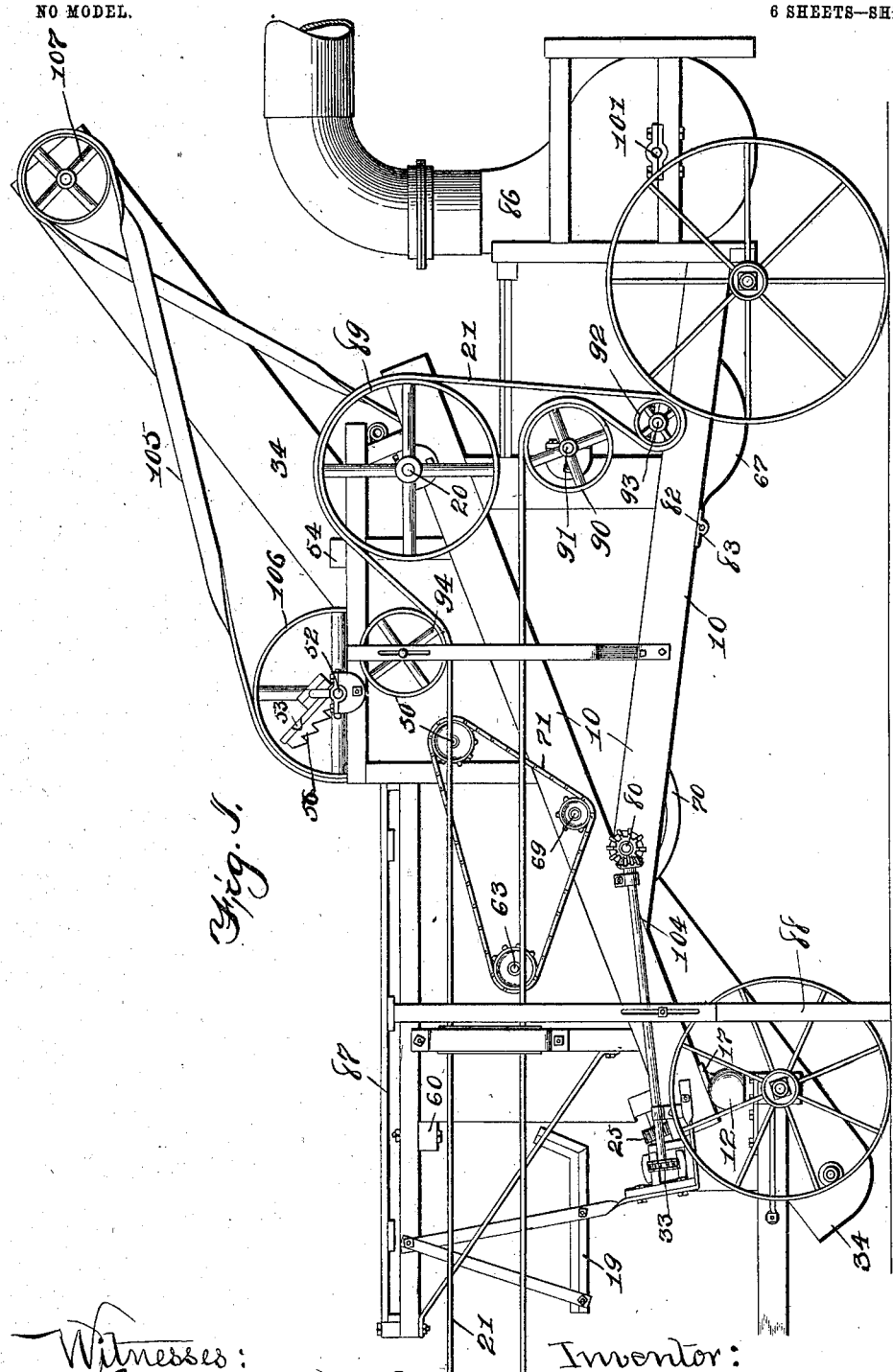

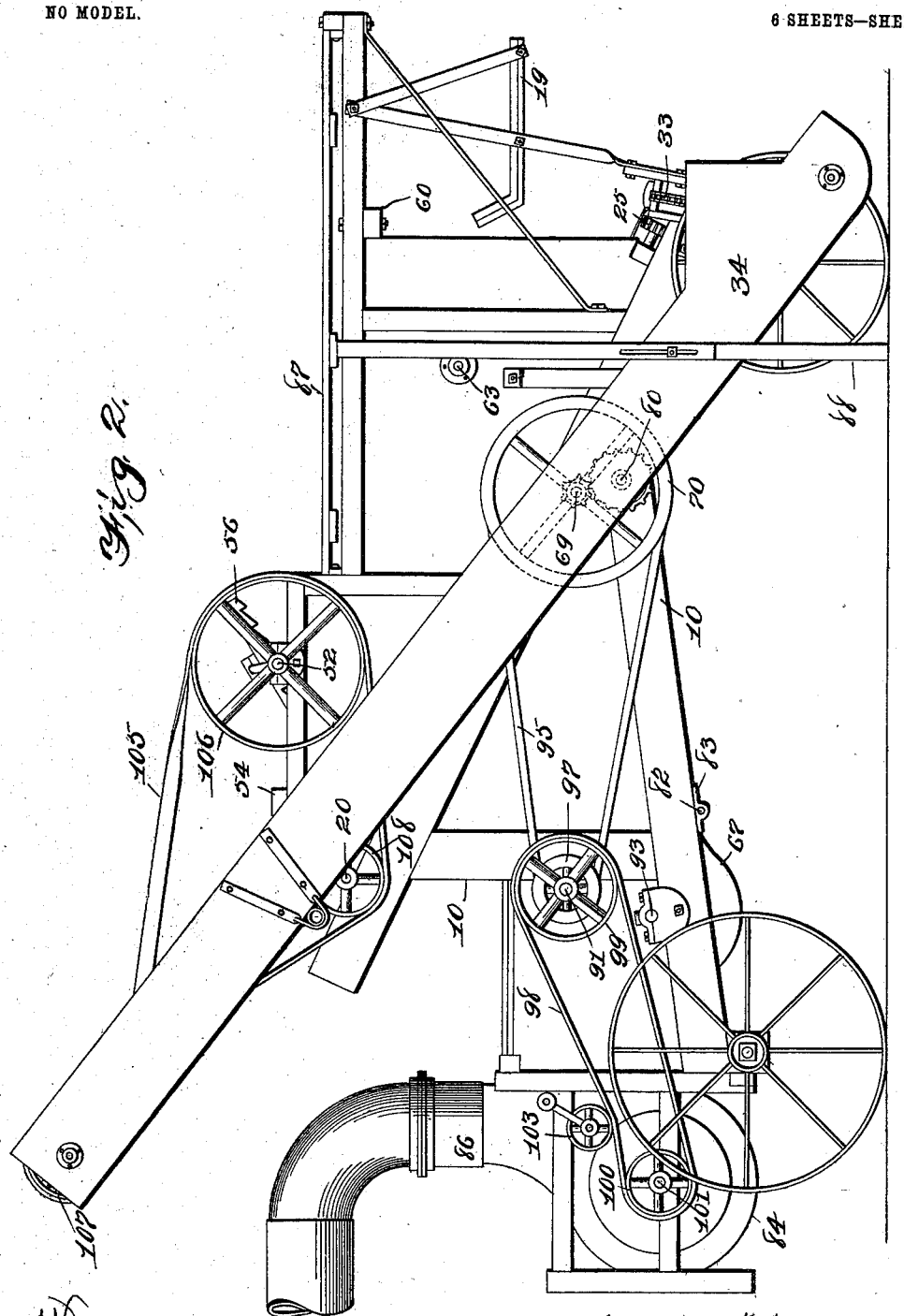

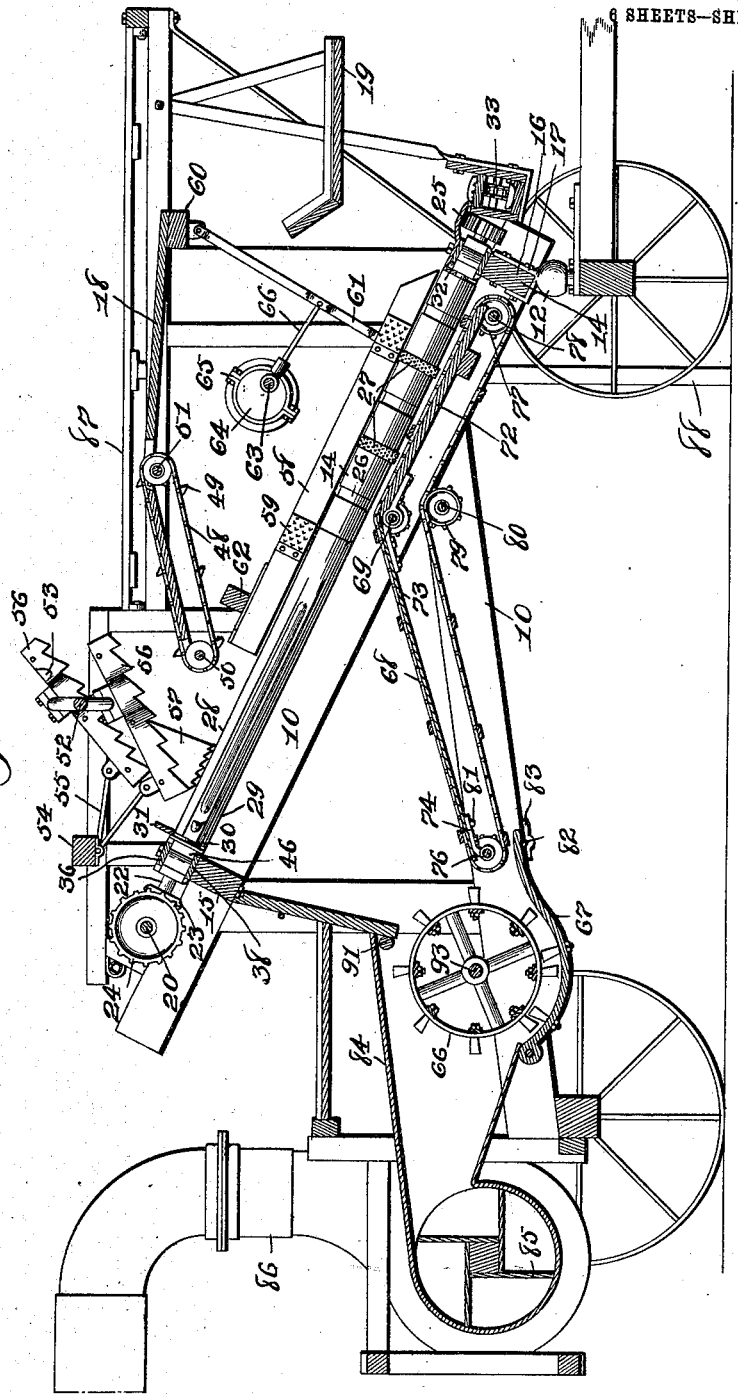

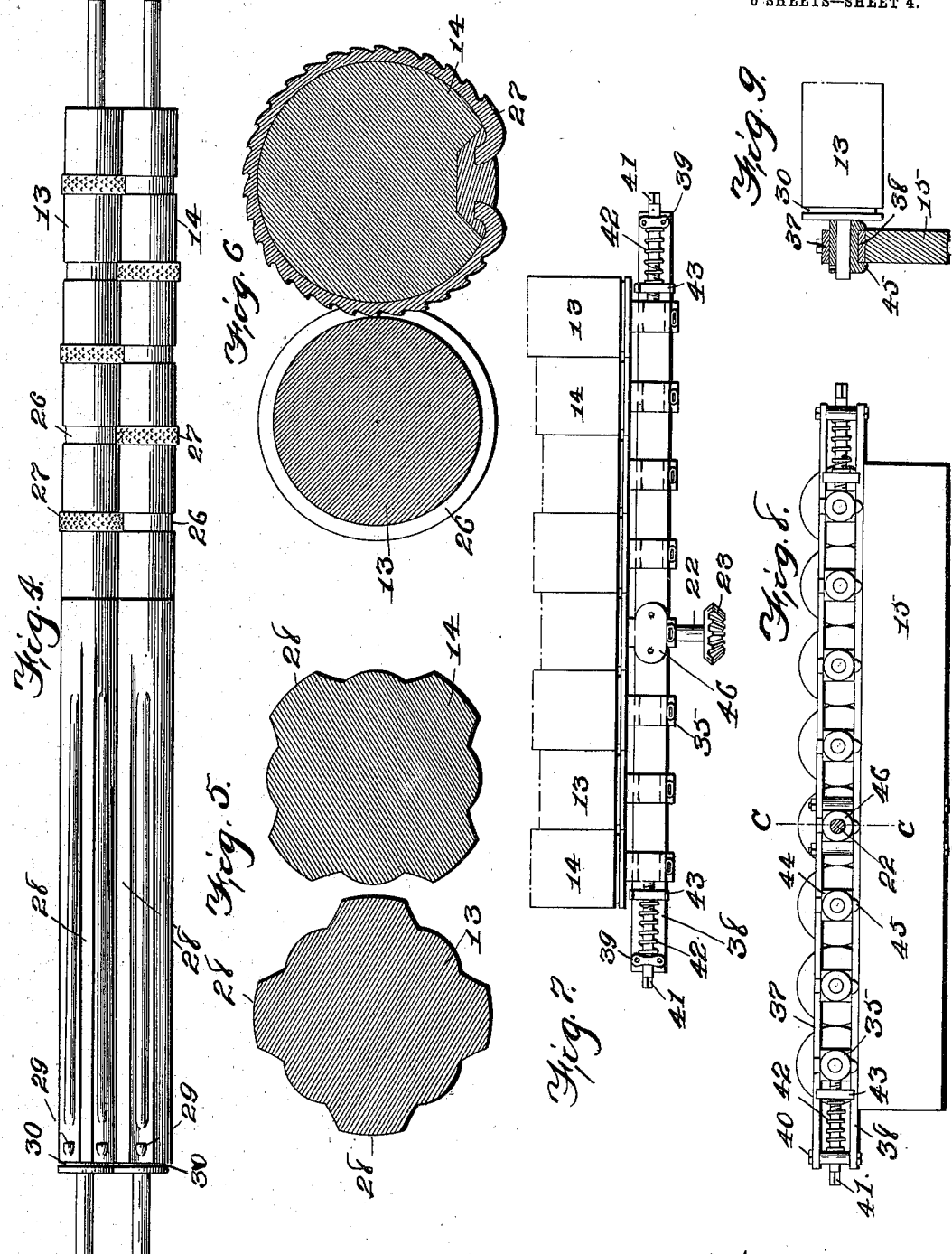

No. 735,308. Patented August 4, 1903.

UNITED STATES PATENT OFFICE.

HOWARD F. SNYDER, OF NEWTON, IOWA, ASSIGNOR TO PARSONS BAND CUTTER AND SELF FEEDER COMPANY, OF NEWTON, IOWA.

CORN SHREDDER AND HUSKER.

SPECIFICATION forming part of Letters Patent No. 735,308, dated August 4, 1903.

Application filed April 7, 1902. Serial No. 101,847. (No model.)

*To all whom it may concern:*

Be it known that I, HOWARD F. SNYDER, a citizen of the United States, residing at Newton, in the county of Jasper and State of Iowa, have invented a new and useful Corn Shredder and Husker, of which the following is a specification.

My object is to provide a portable machine specially adapted for husking corn, crushing and shredding the fodder, and adapting it to be advantageously handled in bulk, baled, stored, and preserved to be utilized for feeding cattle.

My invention consists in the construction, arrangement, and combination of elements and subcombinations, as hereinafter set forth, pointed out in my claims, and illustrated in the accompanying drawings, in which—

Figure 16:
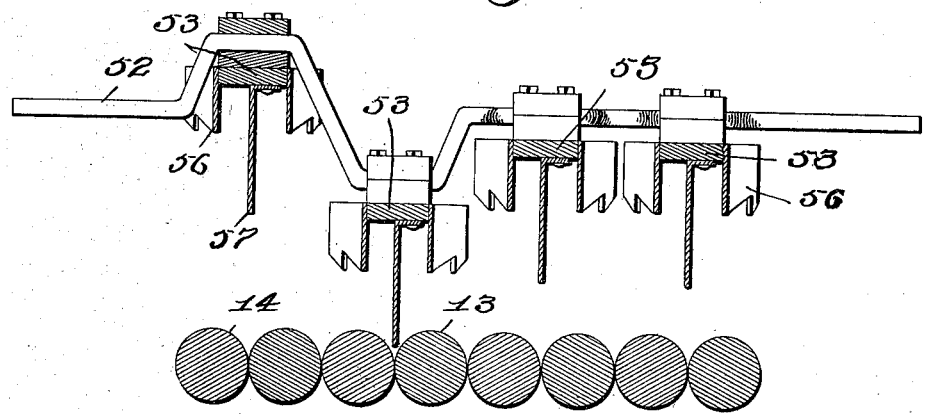
Figure 17:
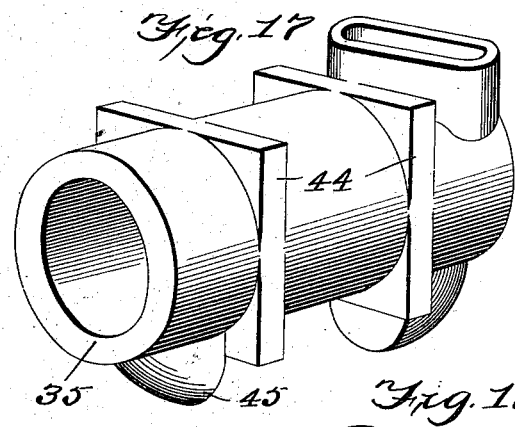
Figure 19:
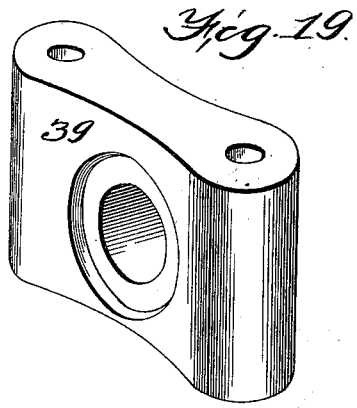
Figure 18:
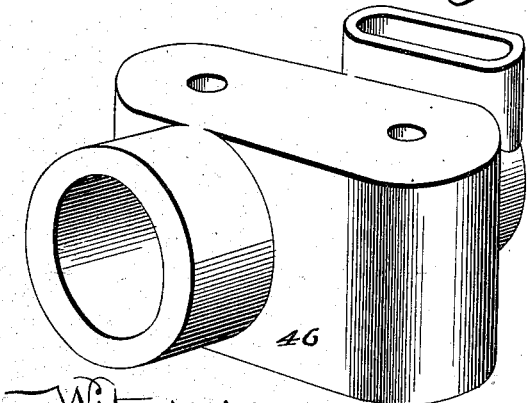
Figure 20:
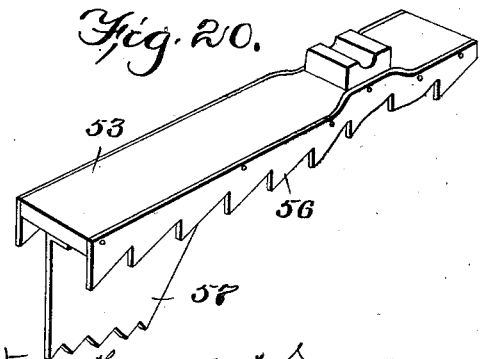

Figures 1 and 2 are side elevations of the machine and show the relative positions of the different operative mechanisms and the manner of connecting them with each other to be actuated in concert by means of power transmitted from an engine by means of a belt. Fig. 3 is a central longitudinal sectional view of Fig. 2 and shows the operative parts that are designed to coact in feeding cornstalks to the husking-rollers, forcing the butt-ends of the stalks downward at the top ends of the husking-rollers, severing ears from the stalks and husking them, delivering the stalks and husks to a cylinder and concave to be shredded, conveying the shredded fodder from one end of the machine and the stripped ears from the other end. Fig. 4 shows a pair of rollers specially adapted for crushing stalks and pinching off ears at one end portion of the rollers and stripping off husks from the ears at their other end portions. Fig. 5 is an enlarged transverse sectional view on the line *a a* of Fig. 4 that shows the peculiar corrugated surfaces of the rollers that adapt them to seize and pull the large ends of stalks downward and crush them during the passage. Fig. 6 is a transverse sectional view on the line *b b* of Fig. 4 and shows a continuous groove in the one roller and toothed band on the other roller adapted to traverse the annular groove and to facilitate seizing and stripping husks from ears of corn as they descend on the husking-rollers to enter a conveyer at the upper ends of the rollers. Fig. 7 is a top view that shows the upper end portions of four pairs of husking-rollers mounted on a support and adjustable tension devices for normally retaining all the rollers in contact with each other. Fig. 8 is an end view of the lower ends of the rollers, also mounted on a support, and tension devices in engagement with the adjustable bearings of the outside rollers of the series. Fig. 9 is a sectional view on the line *c c* of Fig. 8 and shows one of the central pair of rollers in a fixed bearing. Fig. 10 is an enlarged longitudinal sectional view of the large end portion of one of the husking-rollers, and dotted lines thereon indicate the tapering of the ribs and grooves on the corrugated surface. It also shows an annular groove and shoulder that is adapted to engage the rigid butt-ends of cornstalks and to facilitate starting their downward movement between the rollers. Fig. 11 shows the lower ends of the husking-rollers and a fender provided with slots placed on their journals to prevent husks from passing over the ends of the rollers. Fig. 12 is a detail view showing one of the reciprocating bars suspended over the rollers to facilitate stripping husks from ears of corn as they descend on the rollers. Fig. 13 is a top view of one of the suspended reciprocating bars that has fixed toothed plates adapted to tear husks on ears of corn that come in contact therewith as they descend on the husking-rollers. Fig. 14 is a detail view that shows how the upper ends of the reciprocating bars are slidably connected with a cross-bar above the husking-rollers. Fig. 15 is a block that has an internal screw and is adapted to be slidably connected with the frames that support the slidable journal-bearings and serves as a portion of a tension device for automatically adjusting the husking-rollers relative to each other and fodder that passes down between them and separates the rollers when forced down between the rollers. Fig. 16 is a sectional view on the line *d d* of Fig. 3 and shows operative mechanism connected with crank-shafts to aid in feeding cornstalks to the husking-roller. Fig. 17 is an enlarged perspective view of one of the roller journal-bearings adapted to be slidably mounted on a fixed support for a husking-roller. Fig. 18 is a perspective view of a roller journal-bearing adapted to be fixed to a fixed support for a husking-roller, as shown in Figs. 7, 8, and 9. Fig. 19 is a perspective view of an end piece of a frame for supporting husking-rollers and the screw of an adjustable roller-journal, as shown in Figs. 7 and 8. Fig. 20 is a detail view of the rake portion of the feeding mechanism that acts in concert with endless chains for advancing cornstalks from a fixed table toward a cylinder adapted for shredding the fodder.

The numerals 10 designate the main portions of a frame adapted to support the operative mechanisms. Its rear end is fixed to the rear axle of the carriage, and its front end is pivotally connected with the front axle by means of a ball-and-socket joint 12 or in any suitable way that will allow the front portion of the carriage to turn to the right and left as required to change the direction of the line of advance in moving the machine about. Four pairs of husking-rollers consisting of mating rollers 13 and 14 upon cross-pieces 15 and 16 fixed to the inclined parts of the frame that extend upward and rearward from the socket-joint coupling 12. The lower part of said coupling is fixed to the front axle of the carriage, and 17 is a metal frame integral with the upper part of the socket-joint and fixed to the cross-piece 16, as shown in Fig. 3. A table 18 is fixed to the parallel front top portions of the frame and adapted for supporting bound sheaves or bunches of cornstalks in proper position to be advanced to the automatic feeding mechanism. The rear end portion of the table is provided with a plurality of slots for the passage of chains and has a downward extension that is provided with corresponding slots for the passage of chains mounted as hereinafter set forth. A platform 19, adapted for a person to stand thereon in proper position for cutting bands of bound sheaves, is fixed to the top and front portion of the frame, as shown in Fig. 3, or in any suitable way to be in a lower plane than the table 18. A driving-shaft 20 is mounted in bearings fixed to the rear and top portion of the frame to be connected with an engine by means of a belt 21 for operating the husking-rollers, as shown in Figs. 3, 7, 8, and 9. The shaft 22 of one of the husking-rollers 13 is extended, as shown in Fig. 7, and has a fixed bevel gear-wheel 23, that connects with a bevel-gear 24 of larger diameter fixed on the driving-shaft 20, as shown in Fig. 3, to transmit power and motion and increased speed from the driving-shaft 20 to the four pairs of rollers 13 and 14, that are connected at their lower ends by spur-wheels 25 in a common way as required to rotate the rollers in each pair toward each other.

All the husking-rollers 13 and 14 are uniform. Their lower end portions are not grooved longitudinally, like their upper end portions, and one roller in each pair has a plurality of continuous annular recesses 26 and midway between the recesses fixed toothed metal bands 27, adapted to traverse recesses, as shown in Figs. 3, 4, and 6, to aid in seizing and stripping husks from ears of corn. By thus arranging the annular recesses 26 and toothed bands 27 relative to each other, as shown, the husks on corn are seized advantageously by the toothed bands and fed between the contacting intervening smooth surfaces of the rollers to be stripped from the corn and fed direct to the double inclined carrier 68 immediately under the lower end portions of the husking-rollers, as shown in Fig. 3.

The upper end portions of the rollers 13 and 14 are fluted longitudinally, and the grooves or flutes are deepest at their upper ends and taper toward the lower ends, as shown in Figs. 4 and 5, and are thereby adapted to grip and pull down and crush between them the large ends of cornstalks first, so that the fodder will fall toward the cylinder, while the ears of corn are pinched off the stalks to descend by force of gravity over the inclined plane composed of the husking-rollers. The shoulders 29 in the longitudinal concaves or flutes at the upper end portions of the rollers 13 and 14 serve as stops to engage the ends of cornstalks and to aid in getting them into the tapering flutes as required to facilitate the crushing and passing of the stalks downward between the rollers. Annular grooves 30 in the upper extremities of the rollers allow a fender-plate 31, that has open slots on its under side, to be placed over journals of the rollers, as shown in Fig. 3 and as required to prevent cornstalks from passing above the fluted ends of the rollers. A corresponding fender-plate 32 is placed on the journals of the lower ends of the rollers, as shown in Figs. 3 and 11, and as required to prevent husks from passing from the rollers to enter a conveyer 33, extending laterally relative to the rollers for carrying husked ears from the rollers to a conveyer 34, adapted to elevate the corn to a wagon.

All the rollers 13 and 14 are mounted in bearings 35, formed, as shown in Fig. 17, excepting one of the rollers, as shown in Figs. 7 and 8, in frames 36, fixed on the cross-pieces 15 and 16, as shown in Fig. 3, in such a manner that the bearings can slide and allow the rollers to be automatically adjusted relative to each other as required to allow the fodder to pass down between them. The frames that support the sliding bearings 35 are composed of flat metal plates 37 and 38, rigidly connected at their ends by means of metal end pieces 39 and bolts 40, as shown in Figs. 7 and 8. These end pieces 39 are provided with bolt-holes and a transverse bore adapted for the passage of a screw 41 and an enlargement of the bore to admit the ends of coiled springs 42, placed on the screw. Screw-seats 43 (shown in Fig. 15) are slidingly fitted to the plates 37 and the screws 41 extended through the screw-seats 43 to engage the outer sliding bearings in such a manner that the sliding motions of said bearings and husking-rollers can be readily regulated by means of the tension devices thus constructed. The bearings 35 are provided with angular enlargements 44, that engage the plates 37 and 38 to prevent vertical motion, and with bosses 45, that prevent longitudinal motion. By this provision for the independent lateral motions of the bearings for the rollers and the prevention of vertical and longitudinal motion and roller-bearers of common form to support the journals of the rollers at their lower ends, the upper ends of the rollers provided with longitudinal grooves to admit the ends of cornstalks and to feed the stalks to the cylinder, while at the same time the lower ends of the rollers have no lateral movement relative to each other, as they strip the husks from the ears and feed the husks to the double inclined endless carrier, the reduction of the stalks and husks into shreds is facilitated.

The extended shaft 22 of the central roller 13 is fitted in a bearing 46, (shown in Fig. 8,) fixed to the plates 37 and 38 by means of a cap-piece 47 and bolts, as shown in Fig. 3 and as required to maintain its bevel-gear connection with the driving-shaft 20, as shown in Fig. 3.

To feed cornstalks from the table 18 to the husking-rollers, the rear end of the table is inclined downward and endless chains 48, provided with teeth 49, are mounted on shafts 50 and 51, that have fixed sprocket-wheels to engage the links of the chains in such a manner that the chains will aid in moving the cornstalks from the table rearward and incline them downward as required to direct the large ends of the stalks to the fluted top ends of the husking-rollers.

By means of the table 18, adapted to retain bundles of corn stationary and its end inclined rearward and downward, and the endless toothed chains that traverse the slots in the table provision is made for advantageously supporting corn on the table and advancing it at the pleasure of the operator to be engaged by the teeth of the chains to pull the corn downward and rearward.

A crank-shaft 52 is mounted on top of the frame and in rear of the endless chains 48, and rake-bars 53 pivotally connected at their central portions with the cranks and connected at their rear ends with a cross-bar 54, fixed to the frame, and links 55 pivotally connected to the fixed cross-bar, as shown in Fig. 3, to coact with the endless chains 48 in feeding cornstalks to the husking-rollers. The bars 53 have concaves in their edges, and to their edges are fitted and fixed toothed metal plates 56, as shown in Fig. 20, and to the under side of the bars are fixed metal plates 57, that are toothed at their lower edges and adapted to move in vertical planes and in alinement with the rollers 13 and 14, as indicated in Fig. 16. By means of the concaves in the sides of the rake-bars 53 they are narrowed at that point, as required, to allow the rake-bars to be vibrated without coming in contact with the cranks to which they are pivotally connected, and also, as required, to produce four lines of teeth on each rake-bar that will traverse four parallel planes as they are vibrated, so they will facilitate the movement of cornstalks that are to be raked and pressed upon the husking-rollers. By means of the concaves in the sides of the bars 53 the main portions of the toothed plates 56 are allowed to be widely separated and to allow the toothed plates 57 to be fixed between them and projected down to near the husking-rollers to facilitate feeding the large ends of the cornstalks to the husking-rollers as required to pass them down between the mating rollers of each pair. Bars 58, that have fixed metal plates 59, provided with rasping outside faces, extend outward and forward at acute angles relative to the bars and husking-rollers, as shown in Figs. 3, 12, and 13. Their front and lower ends are suspended from a fixed cross-piece 60 by hangers 61, and their upper ends are slidably connected with cross-piece 62, fixed to the frame, as shown in Figs. 3 and 14.

To reciprocate the bars 58, a shaft 63 is mounted in bearings fixed to closed sides of the machine, and on the shaft are fixed eccentrics 64, and to the eccentrics are fitted straps 65, composed each of two parts bolted together and provided with fixed pitmen 66, that are pivotally connected with the hangers 61, as shown in Fig. 3, in such a manner that when the shaft 63 is rotated the hangers will be vibrated and the bars 58 reciprocated above the rollers to resist the downward sliding motions of the ears of corn on the rollers and to keep the ears of corn parallel with the rollers, as required, to facilitate the stripping of husks from the corn and forcing the husks down between the rollers.

A cylinder 66 and a concave 67 are located at the rear and lower portion of the frame and provided with teeth adapted for shredding the fodder.

An endless carrier 68 is mounted in an arched position under the husking-rollers, as shown in Fig. 3, to convey husks and crushed cornstalks to the cylinder and concave. The shaft 69, by which the carrier 68 is actuated, has a belt-wheel 70 on its end, by means of which the shaft is rotated in concert with the driving-shaft 20 by a chain 71 on sprocket-wheels on the ends of the shafts 50, 63, and 69, as shown on the outside of the machine in Fig. 1. The carrier 68 is extended over the shaft 69 and moves parallel with the under sides of the lower ends of the inclined husking-rollers and under the apex of the arch composed of a fixed support composed of a wooden inclined plane 72 and a sheet-metal plate 73, hinged to its top, as shown in Fig. 3, and supported at its lower end by shaft-bearers 74, sprocket-wheels 77, fixed on a shaft 78, and loose sprockets 79 on a shaft 80, as shown in Fig. 3. The lower end of the metal plate 73 is supported upon a rod 81, extended through coinciding apertures in parallel parts 10 of the frame or in any suitable way, so the support can be removed and the rear end portion of the carrier, together with the plate 73 and the shaft 76 and its bearings, lowered. The front end of the concave 67 is also supported upon a rod 82, extended through fixed bearers 83 on the bottoms of the parallel parts of the frame in such a manner that the hinged concave can be readily lowered whenever necessary. By thus providing means for lowering the rear end of the endless carrier 68 and the front end of the concave 67 access is gained to the cylinder for advantageously cleaning and repairing the endless carrier and the cylinder by simply withdrawing the rods 81 and 82.

A fan-case 84 is fixed in rear of the cylinder 66 and a rotary fan 85 mounted therein in such a manner that by suction force it will draw the shredded fodder direct rearward from the cylinder into the fan-case and force it out through a spout conveyer 86, that rises from one end portion of the fan-case.

Tables 87 are hinged at the sides of the fixed table 18 to extend forward at the sides of a person on the platform in a plane above the table 18 and provided with extensible supports 88 to aid in retaining cornstalks in proper position before they are advanced to the feed mechanism.

The belt 21 is extended over a belt-wheel 89, fixed on the end of the driving-shaft 20, a belt-wheel 90 on the end of the shaft 91, and a belt-wheel 92 on the end of the cylinder-shaft 93, and a belt-tightener 94 aids in retaining the belt in place, as shown in Fig. 1.

A belt 95 on a belt-wheel 70, fixed to the shaft 69, extends over a small belt-pulley 97, fixed on the shaft 91, and a belt 98 on a larger belt-wheel 99 on the shaft 91 is extended over a pulley 100 on the fan-shaft 101, as shown in Fig. 2, to transmit power and motion from the shaft 91 to the fan, as shown in Fig. 2. A belt-tightener 103 is located above the fan. A rotatable shaft 104 is mounted in bearings fixed to the outside of the machine and connected with the shaft 80 by bevel-gears and the endless conveyer 33, as shown in Fig. 1.

A belt 105 is placed on a belt-wheel 106, fixed to the crank-shaft 52 and extended over a pulley 107 at the top of the conveyer 34 and over a pulley 108 on the end of the driving-shaft 20, as shown in Figs. 1 and 2, to operate the endless carrier of the conveyer.

Having thus described the construction and function of each element and subcombination and the arrangement and combination of all the parts, the practical operation and utility of my invention will be readily understood by persons familiar with the art to which it pertains, and

What I claim as new, and desire to secure by Letters Patent, is—

1. In a machine for husking and shredding corn, a fixed table for supporting corn having a rearward and downward extension and a plurality of slots at each end of the extension for the passage of chains and toothed endless chains mounted on shafts under the extension to traverse the said slots, in combination with husking-rollers extending upward and rearward under the table and the endless chains in the manner set forth for the purposes stated.

2. In a machine for husking and shredding corn, a fixed table for supporting corn having a rearward and downward extension and a plurality of slots at each end of the extension for the passage of chains and endless toothed chains mounted on shafts under the extension to traverse the said slots, in combination with husking-rollers extending upward and rearward under the table and the endless chains and means for pressing the ends of the cornstalks downward upon the husking-rollers, arranged and combined to coact in the manner set forth for the purposes stated.

3. In a machine for husking and shredding corn, a crank-shaft, rake-bars having concaves in their edge portions, toothed metal plates fixed to their under sides and central lines to be reciprocated in planes in alinement with the spaces between the mating husking-rollers close to the rollers, metal plates fitted and fixed to the concaved edges and provided with teeth, and the ends of the rake-bars, pivotally connected with the cranks of the shaft and also connected at their rear ends with the frame by means of links, for the purposes stated.

4. In a machine for husking and shredding corn, a crank-shaft, rake-bars having concaves in their edge portions and metal plates fitted and fixed to the concaved edges and provided with teeth and toothed plates fixed to the free end portions and under sides of the rake-bars pivotally connected with the cranks of the shaft and also connected at their rear ends with the frame by means of links, a fixed table having an inclined slotted extension, rollers at the ends of said extension, chains having fixed teeth on said rollers and husking-rollers, arranged and combined to operate in the manner set forth for the purposes stated.

5. In a machine for husking and shredding corn, a pair of mating rollers provided with parallel concaves or flutes that are deepest at their upper ends and taper from the top ends of the rollers to the central portions of the rollers and adapted to admit the ends of stalks at their ends to project into the concaves to be pinched fast and pulled down and crushed in the concaves by the coöperation of the two concaved rollers in the manner set forth for the purposes stated.

6. In a machine for husking and shredding corn, a pair of mating rollers provided with concaves or flutes that are deepest at their upper ends and taper from the top ends of the rollers to the central portions of the rollers and at their lower end portions of one of the rollers provided with annular grooves and the other roller provided with toothed bands adapted to traverse the said grooves, for the purposes stated.

7. In a machine for husking and shredding corn, a straight bar having metal plates provided with rasping-faces fixed to the parallel sides of the bar to extend at angles, suspended at its lower end and slidingly connected with the machine-frame at its upper end and means for reciprocating the bar, for the purposes stated.

8. In a machine for husking and shredding corn, a straight bar having metal plates provided with rasping-faces fixed to the parallel sides of the bar to extend at angles, suspended at its lower end and slidingly connected with the machine-frame at its upper end and means for reciprocating the bar, in combination with husking-rollers, to operate in the manner set forth for the purposes stated.

9. In a machine for husking and shredding corn, a straight bar, having metal plates provided with rasping-faces fixed to the parallel sides of the bar to extend at angles, suspended at its lower end and slidingly connected with the machine-frame at its upper end, a rotatable shaft, an eccentric fixed to the shaft, a strap on the eccentric, a hanger pivotally connected with the bar and the frame and a pitman fixed to the strap on the eccentric and pivoted to the hanger, arranged and combined to operate in the manner set forth for the purposes stated.

10. In a machine for husking and shredding corn, husking-rollers having longitudinal grooves to admit the large ends of cornstalks, a frame for supporting pairs of husking-rollers composed of two straight flat metal plates, metal end pieces provided with bolt-holes fixed between the ends of the plates, blocks provided with screw-seats slidably mounted between the plates, screws extended through the bolt-holes in the fixed end pieces into the screw-seats and coiled springs on the screws between the screw-seats and the fixed ends, slidable bearings in the frame and the husking-rollers journaled in said bearings, arranged and combined to operate in the manner set forth for the purposes stated.

11. In a machine for husking and shredding corn, a frame for supporting pairs of husking-rollers composed of two straight flat metal plates, metal end pieces provided with bolt-holes fixed between the ends of the plates, blocks provided with screw-seats slidably mounted between the plates, screws extended through the bolt-holes in the fixed end pieces into the screw-seats, coiled springs on the screws between the screw-seats and the fixed ends and metal journal-bearings slidably mounted in the frame for supporting husking-rollers, husking-rollers having longitudinal grooves in the upper ends, means for removing husks from corn at their lower ends and a double-inclined endless carrier under their lower ends, arranged and combined to operate in the manner set forth for the purposes stated.

12. In a machine for husking and shredding corn, a frame for supporting pairs of husking-rollers composed of two straight flat metal plates, metal end pieces provided with bolt-holes fixed between the ends of the plates, blocks provided with screw-seats slidably mounted between the plates, screws extended through the bolt-holes in the fixed end pieces into the screw-seats and coiled springs on the screws between the screw-seats and coiled springs on the screws between the screw-seats and the fixed ends, metal journal-bearings slidably mounted in the frame for supporting husking-rollers, and one journal-bearing fixed in the central part of the frame between said slidable bearings in the frame, a roller having a journal extended through the fixed bearing and provided with a fixed wheel for connecting the roller with driving mechanism, and rollers having annular recesses at their lower end portions to be traversed by toothed bands on contiguous rollers, arranged and combined to operate in the manner set forth for the purposes stated.

13. In a machine for husking and shredding corn, pairs of husking-rollers extending from the front and lower portion of the machine rearward and upward, their upper end portions fluted and their lower end portions provided with annular grooves and toothed bands for stripping the husks from the ears and forcing the husks downward, a fixed double-inclined plane under the lower end portions of the rollers and an endless carrier on said inclined plane for carrying husks upward and rearward on a cylinder in rear of the said double-inclined plane and endless carrier thereon, arranged and combined to operate in the manner set forth for the purposes stated.

14. In a machine for husking and shredding corn, pairs of husking-rollers extending from the front and lower portion of the machine rearward and upward and their upper ends fluted and adapted for crushing cornstalks and pinching off ears of corn and forcing the fodder downward and their lower end portions provided with annular grooves and toothed bands adapted for stripping the husks from the ears and forcing the husks downward, a fixed double-inclined plane parallel with the lower end portions of the rollers, an adjustable carrier-support extending downward and rearward from the top of the fixed double-inclined plane, an endless carrier on said inclined plane and adjustable carrier-support, an adjustable concave under the cylinder and a cylinder and concave at the rear of the endless carrier, arranged and combined to operate in the manner set forth for the purposes stated.

15. In a machine for husking and shredding corn, pairs of husking-rollers extending from the front and lower portion of the machine rearward and upward and their upper end portions fluted and adapted for crushing cornstalks and pinching off ears of corn and forcing the fodder downward and their lower end portions provided with annular grooves and toothed bands adapted for stripping the husks from the ears and forcing the husks downward, a fixed double-inclined plane parallel with the lower end portions of the rollers, an adjustable carrier-support extending downward and rearward from the top of the fixed inclined plane, an endless carrier on said inclined plane and carrier-support, a cylinder and concave at the rear of the endless carrier, a fan-case connected with the concave to extend rearward and a rotary fan in rear of the cylinder and means for coöperating said rollers and carrier, cylinder and fan, arranged and combined to operate in the manner set forth for the purposes stated.

16. In a machine for shredding and husking corn, a fixed double-inclined plane under inclined husking-rollers, a plate hinged to the top of the said fixed inclined plane to incline downward, an endless carrier fitted over the double-inclined plane thus produced, shaft-bearings fixed to the lower end of the hinged plate and a shaft having fixed sprocket-wheels mounted in said bearings, adjustable means for supporting the rear end of the hinged plate, and husking-rollers extended over and parallel with and close to the front portion of the double-inclined plane, arranged and combined to operate in the manner set forth for the purposes stated.

17. In a machine for shredding and husking corn, a fixed double-inclined plane under the lower ends of inclined husking-rollers, a plate hinged to the fixed double-inclined plane to incline downward to produce an arched support for an endless carrier, an endless carrier fitted over the complete double-inclined plane thus produced, shaft-bearings fixed to the lower end of the hinged plate and a shaft having fixed sprocket-wheels mounted in said bearings, means for supporting the rear end of the hinged plate, means for operating said endless carrier in concert with husking-rollers, husking-rollers in parallel position at their front and lower ends with the front portion of the double-inclined plane and endless carrier thereon and a cylinder at the rear end of the double-inclined plane and endless carrier thereon, arranged and combined to operate in the manner set forth for the purposes stated.

18. In a machine for husking and shredding corn, pairs of husking-rollers extending from the front and lower portion of the machine rearward and upward, their upper end portions fluted and their lower end portions provided with annular grooves and toothed bands for stripping the husks from the ears and forcing the husks downward, a fixed double-inclined plane parallel with the lower end portions of the rollers and an endless carrier on said inclined plane for carrying husks first upward and then rearward and downward relative to a cylinder and a cylinder located at the rear and lower end of the double-inclined plane and endless carrier thereon, arranged and combined to operate in the manner set forth for the purposes stated.

19. In a machine for husking and shredding corn, a pair of husking-rollers extending upward and rearward from the front end of the frame of the machine, a bar having rasping sides slidably connected at its upper end with the frame and inclined downward over and in parallel position with the rollers and its lower end suspended by means of a hanger connected with the frame and means for vibrating the hanger and reciprocating the bar, arranged and combined to operate in the manner set forth for the purposes stated.

HOWARD F. SNYDER.

Witnesses:
  E. A. EUSTICE,
  G. H. IRELAND.